350-3.77 SR
XR 3,574,616
TX 3048R
X3055T

April 13, 1971 P. F. MUELLER 3,574,616

MODULATED IMAGE PHOTOGRAPHY

Filed June 9, 1967 3 Sheets-Sheet 1

Peter F. Mueller
Inventor
by Alfred H. Rosen
Attorney

3574616
OR IN 964278

April 13, 1971 P. F. MUELLER 3,574,616

MODULATED IMAGE PHOTOGRAPHY

Filed June 9, 1967 3 Sheets-Sheet 2

INVENTOR
PETER F. MUELLER
BY Alfred H. Rosen
ATTORNEY

INVENTOR
PETER F. MUELLER
BY Alfred H. Rosen
ATTORNEY 3,574,616

MODULATED IMAGE PHOTOGRAPHY

Peter F. Mueller, Concord, Mass., assignor to Technical Operations, Incorporated, Burlington, Mass.

Filed June 9, 1967, Ser. No. 645,042
Int. Cl. G03c 5/04
U.S. Cl. 96—27 14 Claims

ABSTRACT OF THE DISCLOSURE

An optical system is described for constructing an image of a scene from a phase record of the scene modulated with a spatially-distributed periodic carrier in which a diffraction pattern is erected in Fourier transform space, and spatially filtered to construct the image. A phase record comprised of several images overlapping as "multiple exposures" in the same storage medium, each modulated with a periodic carrier extending throughout the image but having a characteristic by which at least one of its diffraction orders convolved with a spectrum of the image is spatially separable from diffraction orders of the other periodic carrier modulations in transform space is described. The several images can represent different scenes; or they can be registered images of a single colored scene, in which case their respective carriers represent spectral zones.

This application relates to copending applications Ser. No. 510,807, filed Dec. 1, 1965, now Pat. No. 3,425,770, and Ser. No. 564,340, filed July 11, 1966, both assigned to the assignee of the present invention.

BACKGROUND OF THE INVENTION

The field of the invention is multiple-image-storage photography in which each image is stored with a unique carrier modulation by which it can be separated from the others by Fourier transform and spatial filtering techniques. In application Ser. No. 564,340 there is disclosed a process of optical construction of a colored image of a scene from a monochrome photographic density record of the scene modulated with three diffraction gratings each representing a unique spectral zone of the original scene. The gratings are physically oriented at unique angles in the record so that three spatially-separated diffraction patterns of a point light source illuminating the record with light that is at least partially coherent can be erected in a plane containing the focused undiffracted image of the source. Such a plane is commonly known as a "Fourier transform plane." The diffraction patterns are each convolved with the same image of the original scene. They share a common zero order location in the transform plane, and each diffraction pattern has at least one order spatially separated from the zero-order location and from like orders of the other diffraction patterns. Light from like orders of the several diffraction patterns is spectrally filtered through a spatial and spectral filter having color filter elements corresponding to the spectral zones represented by the respective gratings, and the spectrally-filtered light from several such orders is brought to a focus in an image plane to provide by color addition a colored image of the original scene.

In Pat. No. 3,425,770 it is taught to record overlapping each other in a single photostorage medium several images of different scenes, each modulated with a unique spatially-distributed periodic carrier, such that diffraction patterns of the several carrier modulations, each convolved with the image it modulates, can be erected with at least one order of each separated from like orders of the others in transform space, where, by spatial filtering of the first or higher orders, any one or more of the individual images may be reconstructed without the others.

The use of phase diffraction gratings in optical systems for color reproduction has been suggested by Glenn, Jr., in Journal of the Optical Society of America, vol. 48, No. 11, November 1958, pages 841–843, and in U.S. Pat. No. 3,078,338. See also "The Focal Encyclopedia of Photography" Focal Press Inc., New York, 1965, vol. II, pages 1536–7, on Thermoplastic Recording. This system of recording impresses the signal image directly as a phase image in a transparent thermoplastic material. The system has only low resolution requirements. In Glenn's reconstruction system, no spectral filter is employed, but instead a system of spatial filters is used to select and pass only a portion of a diffraction order containing that portion of the spectrum corresponding to the color band represented by the modulating grating. This readout system is known to have poor resolution characteristics. The spatial filters used by Glenn are critically related in aperture width to the spatial extent in the Fourier transform plane of the selected portion of the diffraction order containing the desired spectral content. This reconstruction system also requires that the source light be masked, thus uniquely reducing its efficiency.

Developed silver in a photographic silver halide emulsion produces not only a density image, but also an associated relief image. It is known to treat a developed silver halide image to remove the silver and harden the gelatin, thereby producing the relief image without the density image. For example, a tanning bleach can be used which tans the gelatin so that it holds its form while the silver is bleached away, resulting in a transparent relief image. Tanning bleaches are described in detail in "Photographic Chemistry" by Pierre Glafkides, Fountain Press, 1960, vol. II, pages 663–672 (at pp. 666–7).

Certain developing agents, such as pyrogallol, pyrocatechin and hydroquinone low in sulfite developers, produce oxidation products which harden or tan gelatin in areas where development of silver occurs. See "The Focal Encyclopedia of Photography" ibid, at page 1509. The hardened areas correspond closely to the developed silver image. The unhardened gelatin may be washed off in hot water (40° C. or higher), enhancing the relief image. The silver and remaining silver halide may be removed by bleaching and fixing.

Among suitable bleaches are ferricyanide and dichromate bleaches. The latter converts developed silver to salts which can be removed in a fixer solution. Chromic salts are also produced which cross-link and harden the gelatin where the silver was present. "Bullock's" tanning bleach is a representative dichromate bleach; a bath in this bleach for aboout 5 minutes is adequate, after which a 3-minute wash in water followed by fixing for 5–10 minutes in a conventional fixing bath until the visible image is removed, provides the relief image alone.

Prescott's U.S. Pat. No. 3,045,531 column 8, line 36 to column 9, line 40 teaches the use of a technique in this category to make a simple phase grating of controlled thickness for limited purposes, which is "uniform" in the sense that the lines do not vary in cross-sectional contour or thickness as a function of position along the lines.

By definition, phase images do not absorb light; they only redirect it by diffraction and refraction. Ideally, when a photographic transparency is bleached to produce a relief image without a density image, its intensity transmittance becomes a constant, and the amplitude transmittance is a function of the phase shift experienced by radiation on passing through the bleached emulsion. Assuming that the height of the relief image is proportional to the density of the developed silver image, then the phase shift is proportional to the density of the unbleached emulsion, and the amplitude transmittance represents the original stored image. Even if this much can be assumed, however, there is no assurance that both the modulation and the images will be usefully retained if such techniques for producing a relief image are applied to density records of multiple-images with unique carrier modulations as exemplified in the cross-reference applications, or that the relief image records thus produced will be useful for the reconstruction purposes described in those applications. Prescott's patent does not deal with a combined image and carrier modulation; indeed it mentions a range of plus or minus one-eighth of a wavelength for optimum results (col. 9, lines 2–4).

BRIEF SUMMARY OF THE INVENTION

In systems according to application Ser. No. 564,340 the colored image is reconstructed from a density record of the colored scene, and as a result the source light which forms the reconstructed image must pass through two filters—the first being the density record itself, and the second being the spatial and spectral filter used to reconstitute the color values. The present invention has as one of its principal objects to improve the brilliance, and the visual appearance, of scenes reconstructed in color according to the above-described process, by substantially eliminating the density record and thereby substantially removing its effect as a filter of light used to form the reconstructed colored image of the scene. Generally speaking, this is done by converting the density record and its modulations to a phase record with corresponding modulations which is useful to reconstruct a color image of the original scene.

In systems according to application Ser. No. 510,807 the recorded images are reconstructed by spatial filtering in a transform plane, without spectral filtering being required. However, here, too, the source light which forms the reconstructed image must pass through the density record. The present invention contemplates the converting of those records (i.e.: carrier-modulated records of overlapping images of different scenes) also to carrier-modulated phase records which are useful to reconstruct separated images from the combined-image record.

Generally speaking, optical systems which are useful to reconstruct images according to the invention of either of the referenced applications should be illuminated with light which is coherent at the record over at least a few periods of the longest-period spatial carrier modulation stored with the images in the record. Where this modulation is a diffraction grating, this means a few periods of the most widely-spaced grating. What I have found also to be true, and not at all apparent from the prior art, is that the depth of the carrier modulation (i.e.: the grating) on the stored image should not exceed the temporal coherence length of the illuminating light, for if it does then image-wise interference between the modulated image-record and its background cannot be achieved. This requirement is different from any requirement related to the wavelength of the light source, or to the spatial coherence of the illuminating light. Indeed, in the optical reconstruction system in which the invention is useful it will be necessary (for color reconstruction, for example) or desirable to employ a source of white light for illumination. It is therefore a general object of the invention to provide a phase image with spatially-distributed carrier modulation which is limited in depth to the temporal coherence length of the illuminating light with which it is intended to be used.

DESCRIPTION OF THE INVENTION

An exemplary embodiment of the invention, and modes to use it, are described with reference to the accompanying drawings, in which:

FIG. 1 schematically illustrates an optical system in which the invention may be employed;

FIG. 2 illustrates a diffraction pattern which may be produced in a Fourier transform plane by a system according to FIG. 1;

FIG. 3 schematically illustrates a monochrome record of a scene with three carrier modulations representing spectral zones of the scene, according to application Ser. No. 564,340;

If a diffraction grating is positioned in front of a lens and is illuminated by collimated light from a point source, the diffraction pattern in the back focal plane of the lens (called the Fourier transform plane) will appear as a series of images of the source extending in a line transverse to the optic axis and perpendicular to the lines of the grating. If an object, in the form of a density record of a scene optically multiplied with the grating on a photographic transparency, for example, is placed in front of the lens, a diffraction pattern of the grating convolved with the object spectrum appears in the transform plane. Thus, at each diffraction order of the grating an object spectrum is found. A screen placed an appropriate distance beyond the transform plane will show a retransform of the diffraction pattern back to the transparency image (the object) and the grating. An opaque mask positioned in the transform plane, and having transparent apertures passing two or more of the diffraction orders, the apertures being large enough to pass the object spectrum centered at each order, will allow the object information multiplied by a fringe array to be displayed upon retransformation. If the mask has only one aperture, passing only one diffraction order, (i.e.: only one object spectrum) it will display upon retransformation an image of the object without the fringers; this is so because the spacing of the diffraction orders is related to the grating periodicity, and when only one order is passed the period information (i.e.: the periodic modulation) is lost.

The mask placed in the transform plane is technically known as a "spatial filter." A spatial filter may be defined as a device placed in the transform plane of an optical system for modifying amplitude and/or phase of one or more selected spatial frequencies. In the foregoing example, this "modifying" is a blocking by absorption or reflection of all but one or more selected diffraction orders in the transform plane.

Figure 1:
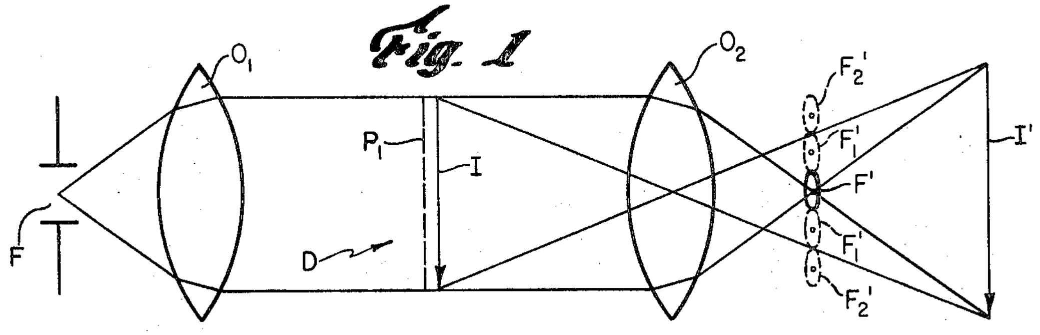

FIG. 1 shows a system having the properties of the foregoing example. The lens system $O_1$–$O_2$ images the light source F at F′, where an oval outline represents the plane in which the image lies, transverse to the system axis. A diffraction grating D, having a system of parallel lines $P_1$ on it, directed normal to the view plane of FIG. 1 so that they are seen end-wise, is positioned in front of lens $O_2$ and is illuminated with collimated light from lens $O_1$. A photographic transparency bearing an object I in the form of a density image of a scene (not shown) is positioned in substantially the same plane with the grating. First and second diffraction orders $F_1'$ and $F_2'$ are also erected with the zero order F′ in the Fourier transform plane; these orders lie in a line transverse to the optic axis of the system and perpendicular to the lines of the grating D. Additional, higher diffraction orders are erected, but these are not shown. An aerial image of the transparency object I is erected in an image plane I′ located beyond the Fourier transform plane. A screen located at I′ will display the aerial image.

The system $P_1$ of parallel lines of the grating D represents but one of three diffraction grating modulations which are multiplied with a scene image in a monochrome record in reference application Ser. No. 564,340, as is illustrated in FIG. 3 of the accompanying drawings, and described below. The remaining two systems of lines have been omitted from the illustration of FIG. 1 to simplify the illustration. From these three modulations a set of three diffraction patterns is erected in the Fourier transform plane, as is described now in connection with FIG. 2.

Figure 2:
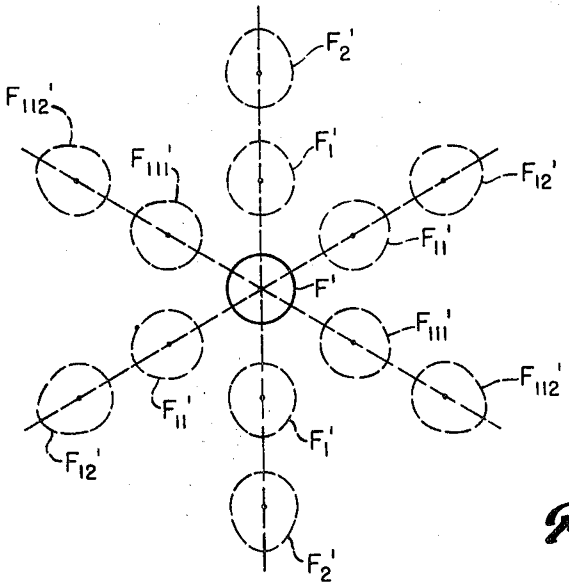
Figures 3, 4A, 4B:
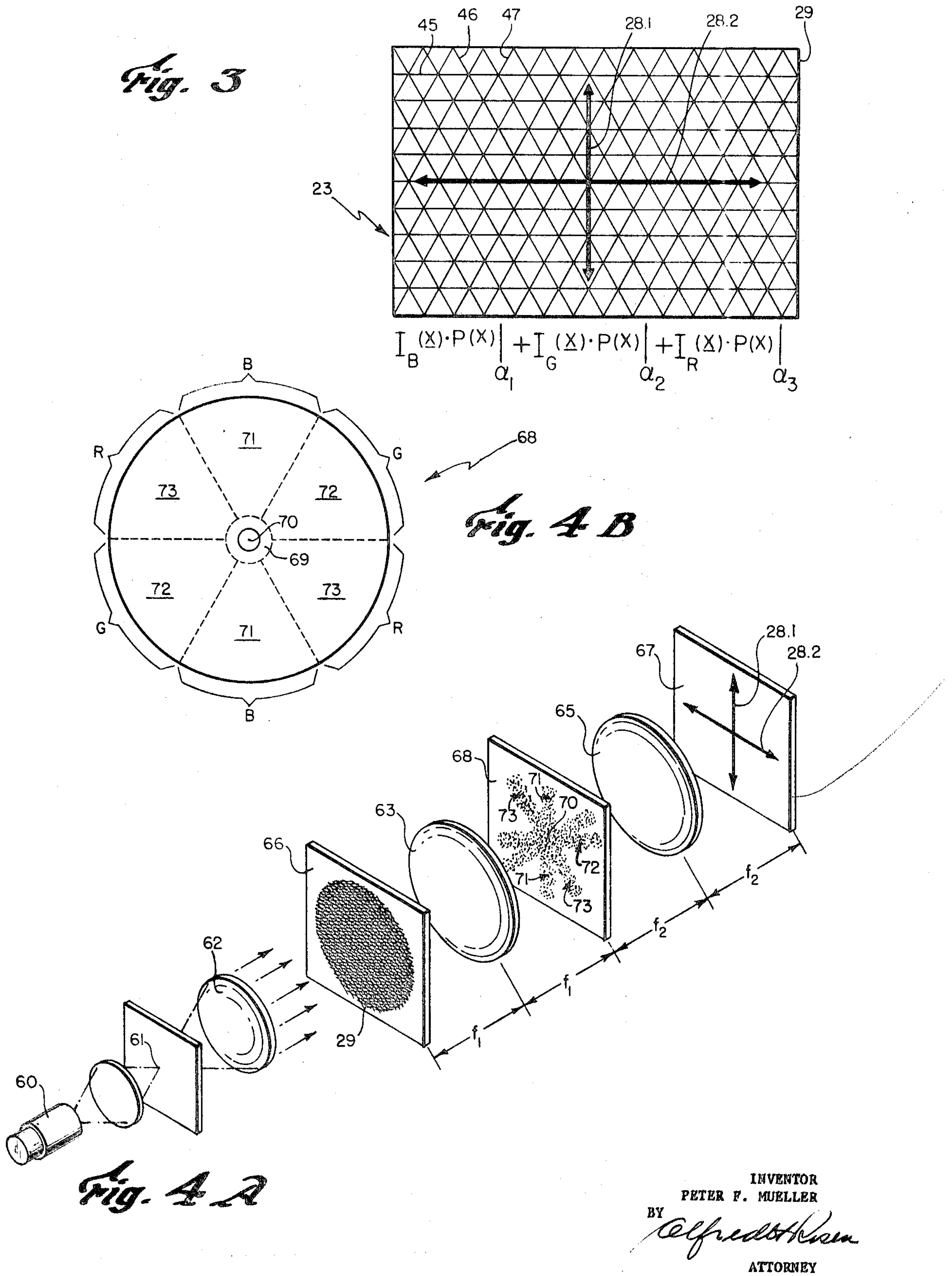
FIG. 4A shows an optical system employing Fourier transform with spatial and spectral filtering techniques to reconstruct a real image of the scene in color.
FIG. 4B illustrates a spatial and spectral filter for use in the system of FIG. 4A.

Referring to FIG. 2, three sets of diffraction patterns are shown, as they would be erected in the transform plane due to the presence of three periodic modulations (not shown) if such modulations were present on the transparency object and oriented at unique angles equally spaced from each other. As is known from Ser. No. 564,340, three superposed images of the same object or scene may be stored in the same transparency, each modulated with a grating representing one of three primary colors of the original object or scene. The diffraction patterns due to these three gratings will be erected in the transform plane in a system according to FIG. 1, about the zero order F, extending out therefrom at the same relative angles as the three gratings bear to each other in the stored image (e.g.: the object I in FIG. 1). Thus, as shown in FIG. 2, if the transparency object I is modulated with three grating images separated by $\pi/3$ about the optic axis, there will be in the Fourier transformer plane a system of three diffraction patterns oriented about the common location of the zero orders (i.e.: at F'). In addition to the diffraction pattern $F_1'$, $F_2'$, etc., there will be two more diffraction patterns $F_{11}'$, $F_{12}'$, etc., and $F_{111}'$, $F_{112}'$, etc., also separated by an angle of $\pi/3$ each from the other. Thus we have a plurality of diffraction patterns erected in Fourier transform space sharing a common zero location order but each said diffraction pattern having at least a higher order spatially separated from its zero order and from the corresponding higher orders of others of said diffraction patterns in the Fourier transform space. If the periodicity of the gratings and the focal length of the second lens system $O_2$ are suitably related, the first orders may be separated from the zero orders and from each other in the transform plane.

According to application Ser. No. 564,340, light from a single scene is multiplied with each of three gratings 45, 46 and 47 to make three exposures simultaneously added in a photo-storage on a plate 23, as shown in FIG. 3. Each exposure shows the same scene, but with a unique modulation representing one of the gratings 45, 46 or 47, and each grating represents a unique color, or spectral band. The resulting final black-and-white storage of color-coded information is thus a density record 29 which is the sum of products according to the relation appearing beneath FIG. 3, and has a configuration substantially as is schematically shown in FIG. 3, where the grating lines are represented crossing over the image of the scene, which is represented by double-headed arrows 28.1 and 28.2. The record 29 stored on the plate 23 is for the purposes of transillumination a density-image transparency.

FIG. 4A illustrates diagrammatically an optical system for reconstructing and viewing or recording colored images are stored in a monochrome density record, as in FIG. 3. This is a partially-coherent optical system comprising a source 60 of white light, pin hole aperture 61, light collector lens 62, converging (or transform) lenses 63 and 65 separated by the sum of their focal length $f_1$ and $f_2$, frame means 66 for supporting the record 29 and support means 67 for supporting a photo-sensitive color medium or a display screen. A color reconstruction filter 68, details of which are shown in FIG. 4B, is located in the back focal plane of the first transform lens 63 and the front focal plane of the second transform lens 65. For simplicity of illustration in FIG. 4A only the grating modulation lines at three different angles are shown in the record 29, but it will be understood that this record is a transparency containing a density image of original scene 28 information carrier modulated with the grating information. The light source 60 should be an intense polychromatic light source; an arc lamp will be suitable. The pin hole aperture 61 is used to increase the coherency of the light and the collector lens 62 following the aperture can be used to provide a light beam of a selected diameter for illuminating the system.

With the record 29 positioned in the frame 66, a diffraction pattern will appear in the transform plane, as shown at the location of the color reconstruction filter 68. Light from the source 60 that is not diffracted by the record 29 will be focused to the center of the transform plane as a spot illustrated as the central illumination spot 70. This spot represents the zero order of each grating and is commonly called the D.C. spot. Since this spot is independent of grating orientation it will be common to all of the individual color-band images superimposed in the record 29. A vertical series of spots 71 represents diffraction orders of the horizontal grating 45, related to the "blue" exposure. Extending out in both directions beyond the zero diffraction order are the first and several higher diffraction orders. The diffraction orders 72 related for example to the "green" exposure (grating 46) are in a line azimuthally rotated 60° clockwise from the diffraction orders 71, and the diffraction orders 73 related for example to the "red" exposure (grating 47) are in a line rotated azimuthally 60° clockwise from the diffraction orders 72.

Reconstruction of the original color scene is obtained by placing a color reconstruction filter 68 as illustrated, for example, in FIG. 4B in the transform plane of FIG. 4A. The color reconstruction filter is, in this illustration, opaque at the center 69, to block the D.C. spot 70. Arrayed about the center in diametrically-opposed pairs are six equal sectors of color filter material. A pair of blue filter sectors (B,B) are located in the path of light forming the diffraction orders 71 related to the blue exposure, a pair of green filter sectors are located in the path of light forming the diffraction orders 72 related to the green exposure, and a pair of red filter sectors are located in the path of light forming the diffraction orders 73 related to the red exposure. A reconstruction, in full color, of the original scene appears in the plane of the support means 67, where it can be recorded on color-sensitive photographic film, or observed on a screen.

Figure 5:
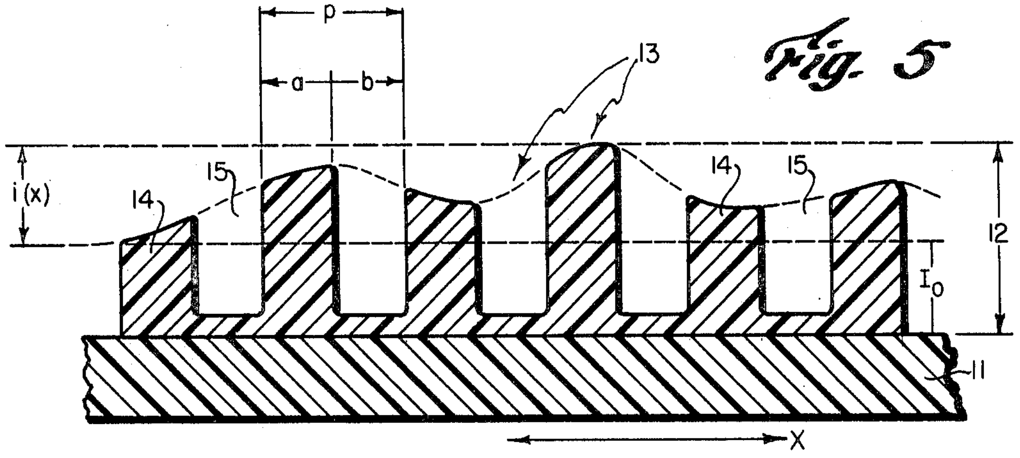
FIG. 5 is a cross-section through a phase record according to the invention.

FIG. 5 illustrates in cross-section a pure phase image made from a photographic density image of which the thickness is linearly proportional to the original characteristic density image $i(x)$ plus some constant thickness $I_0$. This phase image is made in two layers, namely, the substrate 11 supporting the original photographic silver halide emulsion, and the tanned gelatin layer 12 which results from producing the relief image without the density image, according to any known process including those referred to above. The characteristic image $i(x)$ varies in thickness with respect to location $(x)$ in the image, as is represented by the wavy line 13. The constant thickness $I_0$ is due to a pre-fog or a post-fog. In any event, upon producing the relief image without the density image, and assuming that the substrate 11 is transparent, the resulting product is a pure phase image in which $i(x)$ represents the characteristic image and $I_0$ represents a constant thickness.

Given that the original image exposure was made through a ruling (not shown) having opaque bars of essentially rectangular-shaped cross-section, the tanned-gelatin layer 12 is periodically interrupted by spaces 15 of width $(b)$ which may, but need not penetrate to the substrate 11 where the original image exposure was blocked by the opaque bars. The maximum depth of these spaces is $i(x)$ plus $I_0$. These spaces constitute a periodic carrier modulation of the characteristic image $i(x)$. The period of this carrier modulation is $p=a+b$. The remaining portions 14 of the gelatin layer consists of bars of width ($a$) bearing the characteristic image information 13.

Using an optical image-reconstruction system like that shown in FIG. 4A but lacking the filter 68 in the transform plane, the following observations were made while attempting optically to transform a pure phase modulated image into a continuous tone amplitude modulated image.

EXAMPLE I

A pure phase image was made from a given photographic density image without the periodic carrier modulation, of which the optical thickness was linearly proportional to the original image density plus some constant thickness. Phase shifts were confined to the limits $$0<\phi<\frac{4\pi}{3}\text{ for }\lambda=546\text{ m}\mu$$

When this phase image was viewed in the image-reconstruction system (being located in the frame means 66), only outlines and edges corresponding to sharp index-of-refraction gradients were visible as dark regions in the image plane 67. This same result occurred with and without a D.C. filter (i.e.: an opaque stop on the system axis) in the transform plane.

EXAMPLE II

The same phase image as in Example I was sandwiched with a phase grating (Ronchi ruling) and one or more of its Fourier transform harmonic orders were passed by a special filter located in the Fourier transform plane. The same image outlines occurred as in Example I. That is, the phase image was reconstructed.

EXAMPLE III

The original photographic density image was projected through a Ronchi ruling onto a photographic emulsion in contact with the ruling. A pure phase image was prepared from the photographic density image which was developed from the latter emulsion; this phase image had the modulation properties of the ruling as illustrated in FIG. 5. When viewed in the image-reconstruction system, with a spatial filter (not shown) located in the Fourier transform plane to pass one of the harmonic diffraction orders of the modulation together with the complete scene spectrum, this phase image was retransformed by the second lens 65 to produce in the image plane 67 an amplitude image corresponding to the original density image. In this case, the image transparency had periodic strips of constant (e.g.: zero) phase alternating with image-modulated strips, and constituting the carrier modulation, to distinguish it from the images in Examples I and II. The constant-phase strips provide the required coherent background illumination for image reconstruction. The image produced at a screen located in the image plane 67 was a reconstruction of the original photographic transparency, or "density" image.

As is stated above in the discussion of FIG. 4A, the spatial coherence interval of illuminating light at the stored image should be equal to or greater than a few period lengths (P in FIG. 5) of the modulating carrier frequency. The depth $(i(x)+I_0)$ of the modulation in the phase image should, in addition, not exceed the temporal coherence interval of the illuminating light, else interference between the image and the coherent background will not be achieved. That is, light from the open spaces 15, which contain no image information, interferes with light from the bars 14, bearing the characteristic image information 13, to produce an amplitude modulated image in the image plane 67, but for this to be done with minimum loss of detail the distance from the bottom of the open spaces 15 to the outermost tip of the bars 14 (i.e.: the depth $i(x)+I_0$) should not exceed the temporal coherence interval of the illuminating light. The amplitude transmittance of the phase image illustrated in FIG. 5 may be described as $$T_A^{\phi}=(I_0+i(x))^{ik\gamma}P(x)+(I_0)^{ik\gamma}P_{(x\pm p/2)}\quad\text{(Relation A)}$$

Where:

$I_0$=pre- or post-fog
$i(x)$=the image intensity distribution
$i=\sqrt{-1}$
$k$=a constant related to the index of refraction of the emulsion
$\gamma$=process photographic gamma (i.e.: slope of H and D curve)
$P(x)$=the transmission of the Ronchi ruling
$p$=the grating period It can be shown mathematically that if the Fourier transform of this relation is filtered for the first side order in the transform plane, the amplitude distribution in the transform plane may be described as $$T_A^{\phi}(\mu)=\frac{1}{\pi}[\tilde{i}(\mu-\omega_0)-\tilde{I}_0(\mu-\omega_0)]\quad\text{(Relation B)}$$

When:

$\tilde{i}(\mu)$ is the signal Fourier transform;
$\tilde{I}_0(\mu)$ is the background Fourier transform;

Upon Fourier inversion, it can further be shown that the intensity image distribution in the image plane may be described as, provided $i(y)/I_0<<1$:

$$T_I^{\phi}(y)=2\left(\frac{1}{\pi}\right)^2[\cos(k\gamma i(y)/I_0)]\quad\text{(Relation C)}$$

If furthermore $k\gamma i(y)\ I_0$ is sufficiently small (i.e.: ±30°, or $\pi/3$ radians in total) then $$\cos(k\gamma i(y)/I_0)\simeq 1-\tfrac{1}{2}(k\gamma i(y)/I_0)^2$$

and $$T_I^{\phi}(y)=\left(\frac{k\gamma}{\pi I_0}\right)^2 i(y)^2\quad\text{(Relation D)}$$

The reconstructed image thus should look like a high contrast reproduction of the original exposure (density) image. The limitation of $k\gamma i(y)/I_0$ to $\pi/3$ radians assures linearity within about 5%. However, this quantity can be allowed to increase to $\pi/2$ radians without reversal of the image. The mathematical analysis bears out the findings reported in Example III.

The expression of Relation D has no additive terms, but in practice there is an additive noise background which tends to reduce the apparent contrast of the reconstructed image compared to the contrast one might expect from this expression. If the Fourier transform of Relation A is filtered for the D.C. (i.e.: only the zero order is passed) the amplitude transmittance is $$T_I^{\phi}(\mu)=\tfrac{1}{2}[i(\mu)+I_0(\mu)]\quad\text{(Relation E)}$$

The significant difference between Relation B and Relation E is that in the latter the background level $I_0(\mu)$ is added to instead of subtracted from $i(\mu)$.

Upon Fourier inversion, it can again be shown, under the same assumption as before, that $$T_I^{\phi}(y)\simeq 2(\tfrac{1}{2})^2[1+\cos(k\gamma i(y)/I_0)]\quad\text{(Relation F)}$$

and that $$T_I^{\phi}(y)\simeq\left(\frac{I_0}{k\gamma}\right)^2\left(\frac{1}{i(y)}\right)^2$$

Thus, aside from a different multiplicative constant, the

D.C.-filtered reconstructed image appears like the inverse (i.e.: negative) of the image reconstructed from the filtered first side order.

FIG. 5 illustrates a phase record of a single scene carrier modulated with a grating the lines of which are directed normal to the figure. The structural and functional principles which render it useful to reconstruct an amplitude modulated image of the scene are applicable as well to a monochrome density record of a single scene modulated with a plurality of unique overlapping carriers, as in FIG. 3 and application Ser. No. 564,340, and to a density record of several overlapping scenes each modulated with a unique carrier overlapping the others as in application Ser. No. 510,807, described briefly below in connection with FIGS. 6 to 8. That in all such density records can be converted by known means and techniques to pure phase images from which amplitude modulated images can be reconstructed, if the original scene is first multiplied with a modulating filter and developed to a density image the thickness of which is substantially proportional to the amplitude of the impressed light signal, and this density image is then converted to a phase image.

Figure 6A:
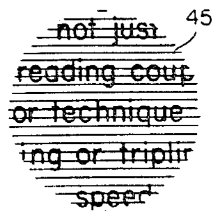
FIG. 6 illustrates images of three different scenes each modulated with a unique spatial carrier modulation.
Figure 6B:
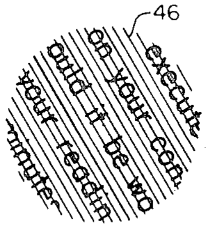
Figure 6C:
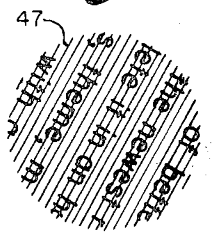

According to application Ser. No. 510,807, light from several (e.g. three) different scenes is multiplied with a grating having a unique orientation characteristic for each scene and the exposures are made overlapping in the same area of a photo storage plate. The resulting stored images resemble FIG. 3, except that the stored images are of different scenes, rather than the same scene. Thus, an object, such as a printed page (not shown) modulated by one of the gratings 45 may be photographed on the plate 23, as is represented schematically in FIG. 6A; a second object modulated by another of the gratings 46 may be photographed on the plate 23, double-exposed with the first image; and a third object modulated with the third grating 47 may be photographed on the plate 23, triple-exposed with the first two images. Each image will be multiplied with its unique grating, and all three images will be added in the plate 23. The configuration of the stored image will be similar to that shown in FIG. 3, except that, instead of an image of one scene resulting in one image 28.1 and 28.2, we now have images of three different scenes one on top of the others, as would be expected from a triple exposure to three different scenes. The representation of grating images shown in FIG. 3 is, however, the same. FIGS. 6A, 6B and 6C schematically show three different printed texts, each representing a different scene, as photographed through the respective gratings 45, 46 and 47. These are superposed on the plate 23 in a composite stored record 29.5 in FIG. 7 containing the triple exposure. The individual images can be separately read out in a system as shown in FIGS. 7 and 8.

Figure 7:
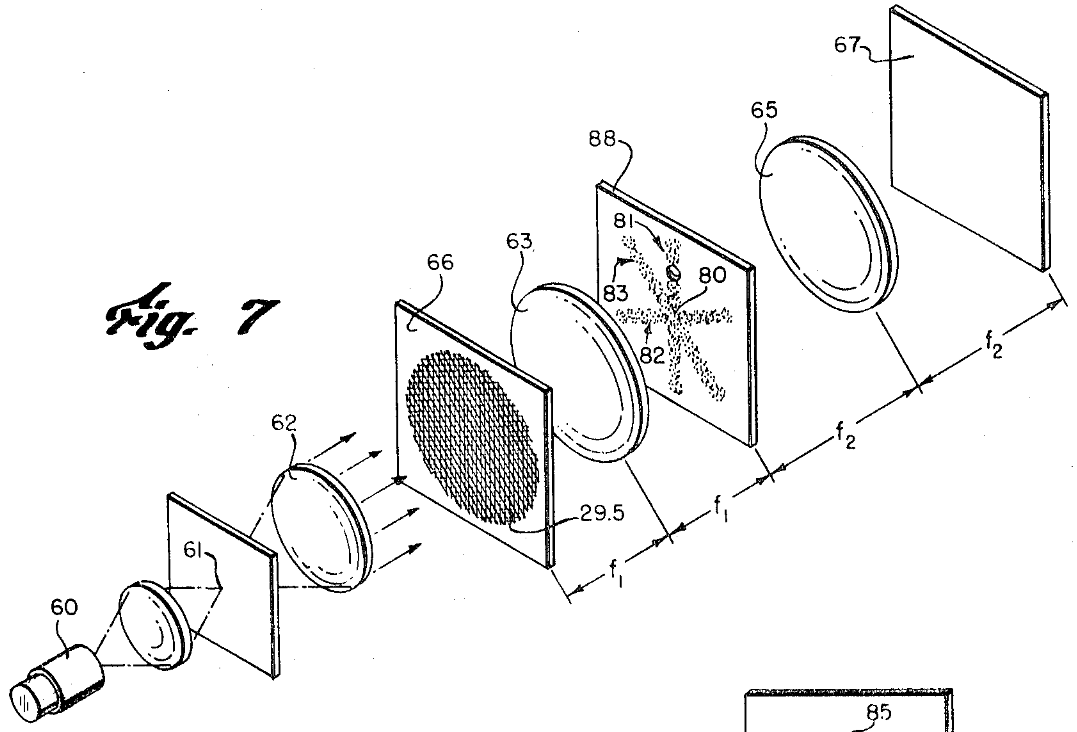
FIG. 7 shows an optical system employing Fourier transform with spatial filtering techniques to reconstruct one of the images of FIG. 6 from a record having all of them stored in a mutually overlapping configuration.
Figure 8:
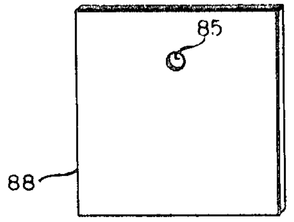
FIG. 8 illustrates a spatial filter suitable for use in the system of FIG. 7.

FIG. 7 is identical to the system of FIG. 4A, except that the multi-image record 29.5 is substituted for the single color coded image record 29, and that a different spatial filter 88 is used in FIG. 7. The diffraction pattern which appears in the transform plane now comprises the overlapping zero orders 80, in which all the images are present, and diffraction orders 81 of the image spectra of the first grating 45, diffraction orders 82 of the image spectra of the second grating 46, and diffraction orders 83 of the image spectra of the third grating 47. Each diffraction order of each grating contains complete information of the scene which was taken through that grating. The spatial filter 88 is an opaque sheet in the transform plane, containing an aperture 85 of a size to pass the light from one only diffraction order of only one grating, so that one of the scenes appears in the image plane at the support 67, where it may be viewed or photographed. This technique for separating multiple-stored images is described in greater detail and claimed in the above-mentioned Patent No. 3,425,770.

The embodiments of the invention which have been illustrated and described herein are but a few illustrations of the invention. Other embodiments and modifications will occur to those skilled in the art. For example, it is not necessary to make the image exposure through a Ronchi ruling as shown in FIG. 5; other forms of periodic carrier modulation can be used. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims.

I claim:

1. In the method of information photostorage comprising:

exposing a silver halide photosensitive material to a plurality of additively superimposed images;

during the said exposure operation, causing a unique periodic grating function to be multiplied with each of said images; and processing the exposed photosensitive material including developing and fixing the material to form a density record containing said images respectively modulating spatial carriers separable by optical Fourier transformation and spatial filtering techniques, the improvement comprises bleaching and tanning the said density record to form a phase record containing spatial carriers respectively modulated by said images, said processing being controlled such that the phase shift induced in an illuminating light beam by any modulated carrier element is less than the temporal coherence length of the illuminating beam.

2. The method defined by claim 1 wherein said processing of the exposed photosensitive material is such that the modulation of said carriers is substantially proportional to the scene exposure of said photosensitive material.

3. A method of spectral zonal photography comprising:

exposing a silver halide photosensitive material responsive to radiation in all spectral zones desired to be recorded to an additive superposition of spectral separation images formed in radiation propagating from a photographed scene in at least three different zones of the electromagnetic spectrum;

during the said exposure operation, causing a periodic grating function to be multiplied with each of said separation images, said grating functions having a different azimuthal orientation for each image; and processing the exposed photosensitive material including developing and fixing the material to form a density record containing said separation images respectively modulating azimuthally distinct spatial carriers, and bleaching and tanning the said density record to form a phase record containing spatial carriers respectively modulated by said images, said processing being controlled such that the phase shift induced in an illuminating light beam by any modulated carrier element is less than the temporal coherence length of the illuminating beam.

4. The method defined by claim 3 wherein said processing of the exposed photosensitive material is such that the modulation of said carriers is substantially proportional to the scene exposure of said photosensitive material.

5. A method of spectral zonal photography, comprising:

exposing a silver halide photosensitive material responsive to radiation in all spectral zones desired to be recorded to a scene multiplied with a spectral zonal encoder comprising at least three mutually coextensive, azimuthally distinct periodic arrays of filter elements each having a preferential absorption for a different spectral zone; and processing the exposed photosensitive material including developing and fixing the material to form a density record containing said separation images respectively modulating azimuthally distinct spatial carriers, and bleaching and tanning the said density record to form a phase record containing spatial carriers respectively modulated by said images, said processing being controlled such that the phase shift induced in an illuminating light beam by any modulated carrier element is less than the temporal coherence length of the illuminating beam.

6. The method defined by claim 5 wherein said processing of the exposed photosensitive material is such that the modulation of said carriers is substantially proportional to the scene exposure of said photosensitive material.

7. A method of information photostorage comprising:

exposing a silver halide photosensitive material to a plurality of additively superimposed images;

during the said exposure operation, causing a unique periodic grating function to be multiplied with each of said images;

processing the exposed photosensitive material including developing and fixing the material to form a density record containing said images respectively modulating spatial carriers separable by optical Fourier transformation techniques and bleaching and tanning the said density record to form a phase record containing spatial carriers respectively modulated by said images, said processing being controlled such that the phase shift induced in an illuminating light beam by any modulated carrier element is less than the temporal coherence length of the illuminating beam;

locating the developed record in a beam of light which is substantially coherent;

forming in a Fourier transform space a diffraction pattern of said record including separated spectral orders respectively characterizing different images; and selectively transmitting through said Fourier transform space at least one of said spectral orders.

8. The method defined by claim 7 wherein said processing is such that the phase shift induced in the shortest wavelength of utilized light in an illuminating beam by any modulated carrier element is at most $\pi/2$ radians.

9. The method defined by claim 7 wherein said processing of the exposed photosensitive material is such that the modulation of said carriers is substantially proportional to the scene exposure of said photosensitive material.

10. The method defined by claim 9 wherein said processing is such that the phase shift induced in the shortest wavelength of utilized light in an illuminating beam by any modulated carrier element is at most $\pi/3$ radians.

11. The method defined by claim 1 wherein said processing is such that the phase shift induced in the shortest wavelength of utilized light in an illuminating beam by any modulated carrier element is at most $\pi/2$ radians.

12. The method defined by claim 2 wherein said processing is such that the phase shift induced in the shortest wavelength of utilized light in an illuminating beam by any modulated carrier element is at most $\pi/3$ radians.

13. A photographic phase record containing a plurality of additively superimposed images respectively multiplied with unique spatial carriers suitable for processing in a coherent optical projection system, comprising a transparent film base and an exposed, developed, fixed, bleached, and tanned silver halide emulsion containing spatial carriers respectively modulated by said images, the phase shift induced in an illuminating light beam by any modulated carrier element being less than the temporal coherence length of the illuminating beam.

14. The record defined by claim 13 wherein the modulation of said carriers is substantially proportional to the scene exposure of said emulsion.

References Cited

UNITED STATES PATENTS

| | | | |
|---|---|---|---|
| Re. 20,748 | 6/1938 | Bocca | 18—16.4 |
| 3,305,834 | 2/1967 | Cooper et al. | 340—146.3 |
| 3,370,268 | 2/1968 | Dobrin et al. | 340—15.5 |
| 3,425,770 | 2/1969 | Mueller et al. | 350—162 |

GEORGE F. LESMES, Primary Examiner

B. BETTIS, Assistant Examiner

U.S. Cl. X.R.

350—162, 3.5; 95—12.2